United States Patent [19]
Morin

[11] Patent Number: 5,870,961
[45] Date of Patent: Feb. 16, 1999

[54] CASCADING PARTICLES AND SEEDS DISPENSER

[76] Inventor: Thomas M. Morin, 182 W. Mountain Rd., Adams, Mass. 01220

[21] Appl. No.: 858,437

[22] Filed: May 19, 1997

Related U.S. Application Data

[63] Continuation-in-part of Ser. No. 617,104, Mar. 18, 1996, Pat. No. 5,664,506.

[51] Int. Cl.⁶ ....................................................... A01C 1/00
[52] U.S. Cl. ............................................... 111/95; 111/200
[58] Field of Search .................................. 111/92, 94, 95, 111/200; 47/1.01 R, 48.5, DIG. 12

[56] References Cited

U.S. PATENT DOCUMENTS

| | | | |
|---|---|---|---|
| 1,856,065 | 5/1932 | Austin | 111/94 |
| 2,570,081 | 10/1951 | Szczeniowski | |
| 4,771,912 | 9/1988 | Van Wingerden | |
| 5,414,955 | 5/1995 | Morin | 47/1.01 R |
| 5,452,672 | 9/1995 | Lay | 111/95 X |
| 5,524,559 | 6/1996 | Davidson | 111/200 |
| 5,664,506 | 9/1997 | Morin | 111/95 |

FOREIGN PATENT DOCUMENTS

| | | | |
|---|---|---|---|
| 868795 | 1/1953 | Germany | 47/DIG. 12 |
| 2009629 | 3/1994 | Russian Federation | 111/92 |
| 1175373 | 8/1985 | U.S.S.R. | 111/200 |
| 1748687 | 7/1992 | U.S.S.R. | 47/DIG. 12 |

*Primary Examiner*—Michael J. Carone
*Assistant Examiner*—Christopher J. Novosad

[57] ABSTRACT

A particle/seed dispenser is composed of a motor-spatula assembly and a base housing, or handle. The motor-spatula assembly includes two or more V-shaped spatulas and an electrical motor physically connected to a proximal end of each V-shaped spatula, or separate motors are connected to the respective spatulas. The motor rotor(s) is(are) eccentric, namely the rotational center of gravity of the rotor is not exactly co-axial with the axis of the rotor drive shaft so that when running the motor and the motor-spatula assembly vibrate. Successive first, second etc. spatulas extend from the base-housing, each under the previous, the successive spatulas being of increasing length so that particles poured into the first cascade out to the second, and in some cases from there to the third etc. For more effective singulation a series of dremples or rills are formed in the trough of each spatula. The cascading of the particles through successive spatulas provides a substantial improvement in the regularity in the rate of dispensing the particles.

15 Claims, 5 Drawing Sheets

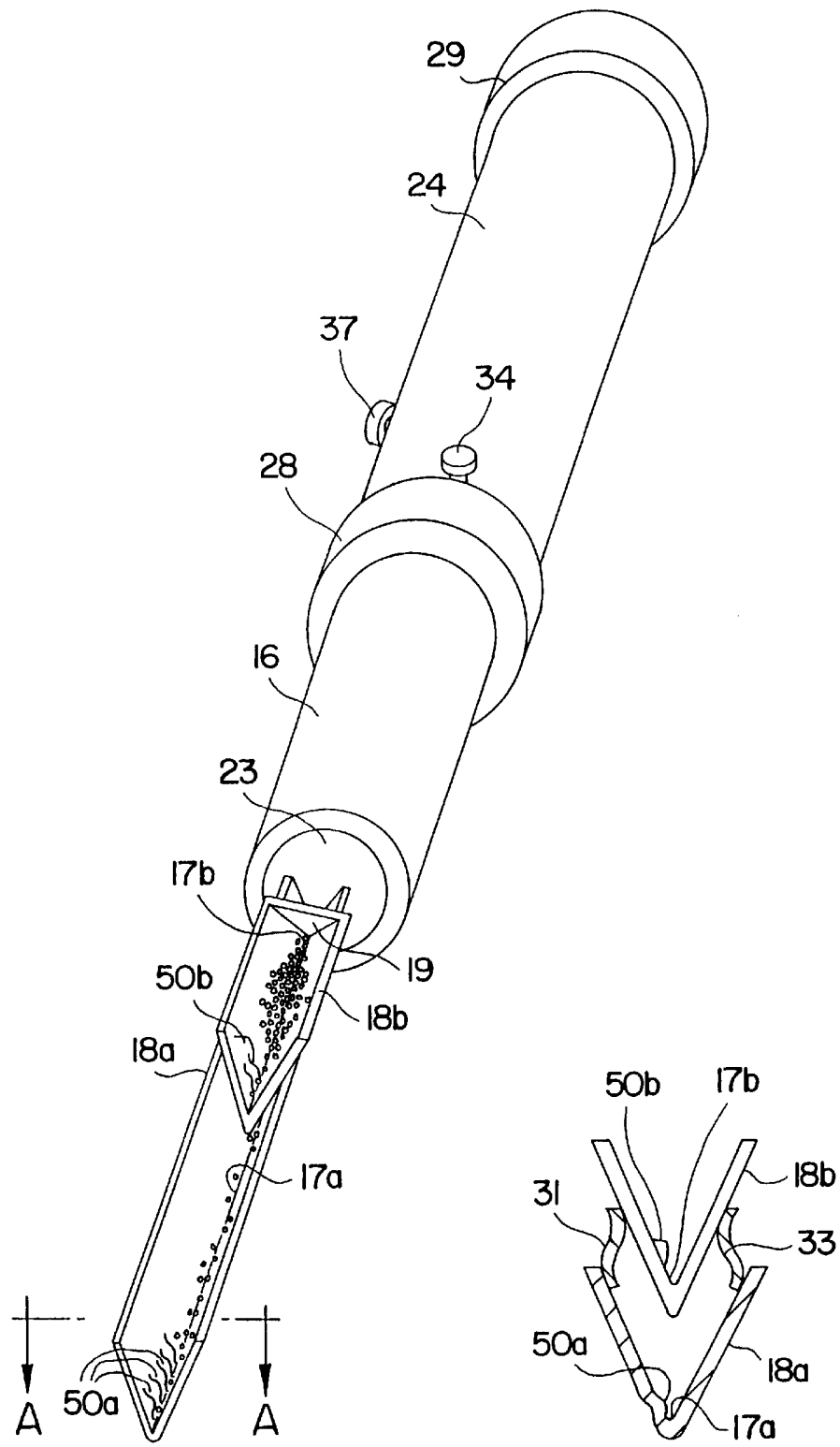

5,870,961

CASCADING PARTICLES AND SEEDS DISPENSER

CROSS REFERENCES TO RELATED APPLICATIONS

This is a continuation in part of co-pending patent application Ser. No. 08/617,104 filed Mar. 18, 1996.

BACKGROUND

This invention relates to a hand held motor-vibrated seeder or more generally to a particle dispenser for dispensing powder particles into a chemist's weighing dish, or dispensing seeds sequentially into earth-containing pockets of a grower's seedling tray, otherwise known as a plug tray.

A chemist is often required to weigh out exact quantities of each of several chemical powders that will be mixed and chemically co-reacted. This laboratory weighing process typically consists of manually shaking a powder from a container onto a weighing dish for weighing. Ideally, the shaking is stopped when the desired weight is reached, but because great precision is required, it is difficult to stop at the right moment because of the irregular and uncontrolled powder-pouring rate.

The term "particle" as used hereinafter is meant to include seeds.

Home owners and other small scale growers of flowers and vegetables tolerate the imprecision of dispensing seeds directly by hand, and often compensate by awaiting sprouting after which they may then be thinned by hand.

For larger scale growers, the direct dispensing by hand is not tolerable because of the associated large labor costs. For commercial growers, there is described in my patent U.S. Pat. No. 5,414,955, issued May 16, 1995, a seeder that simultaneously picks up many individual seeds and simultaneously dispenses each one in a corresponding of regularly spaced apart seedling-tray pockets.

For small scale growers, there has been used a hand held seeder having a handle and a V-shaped spatula mounted in the handle. A buzzer and a battery are mounted together and to the spatula end in that is mounted in the handel. Such buzzers have a coil of wire wound about an iron core and flexible conductive ferrous reed having one end fixedly mounted and the opposite end normally lying against an electrical contact. One end of the wire coil is electrically connected to the fixed end of the reed.

When a voltage is applied to the contact and the other end of the wire coil, the reed and contact serve momentarily as a closed electrical switch, causing a current in the coil that produces a magnetic field that draws the other end of the reed to hammer the core, ending a first vibration cycle. This breaks the circuit and the reed falls back on the contact which begins a sequence of such cycles of buzzer vibrations.

It is an object of this invention to provide a particle dispenser providing improved particle singulation and improved dispensing accuracy.

It is a further object of this invention to provide a particle dispenser that dispenses particles at a slow and more constant rate.

It is another object of this invention to provide such a dispenser suitable for being manufactured as a hand-held particle dispenser.

SUMMARY OF THE INVENTION

A particle dispenser comprises a base housing, a vibration means supported by the base housing, and a pair of elongated V-shaped spatulas each having a proximal end portion connected to the vibration means to become vibrated by the vibration means. The distal ends of the two spatulas may extend away from the base housing in about the same direction. The bottom side of a first of the pair of V-shaped spatulas faces the open side of the second of the V-shaped spatulas. A spatula bottom side is defined as the opposite side of the spatula open or trough side, and the distal end of the second spatula extends farther away from the base housing than does the distal end of the first spatula.

FIG. 1a shows the motor 21 in end view with there having been added a cam 22 pressed on the motor drive shaft 22.

Thus, when particles are poured into the open side of the first spatula, and when the particle dispenser is held with the dual spatulas about horizontal and the spatula open sides oriented upward, the particles become vibrated to fall regularly from the first-spatula distal end into a middle open-face portion of the second spatula, and will become vibrated to fall again and at a more regular rate from the farther-extending second-spatula distal end. Even further dispensing regularity may be obtained by the addition of a vibrating third spatula into which the particles cascading from the second spatula fall into and are dispensed from the third spatula.

It is preferred that there be at least one surface interruption formed in the trough surface near the trough valley bottom in each of the spatulas. Such a surface interruption may be a dremple protruding inward toward the open-face trough of the each spatula. Alternatively the surface interruption may be a rill amounting to a recess in the trough surface. These surface interruptions are preferably located adjacent the distal end of the each spatula. And such surface interruptions are preferably offset from the valley bottom of the spatula trough. A series of such surface interruptions formed along at least one side of the trough is especially effective in enhancing regularity in particle distribution.

A preferred vibration means is simply an electrical motor with a rotor that is restrained to rotate about an axis that is not coincident with the rotor rotational center of gravity, and it is preferred to mount the motor fixedly to the proximal end of at least one spatula. The spatulas other than the at least one spatula may be fixedly mounted to separate motors, or alternatively may be mounted to a mid portion of the at least one spatula so as to connect indirectly to the one primary source of vibration.

BRIEF DESCRIPTION OF THE DRAWINGS

FIG. 2 shows in perspective view the particle dispenser of FIG. 1.

FIG. 3 shows the two spatulas of the dispenser of FIGS. 1 and 2 in sectional end view, taken in section A—A of FIG. 2 through a dremple 50a.

DESCRIPTION OF THE PREFERRED EMBODIMENTS

Figure 1:
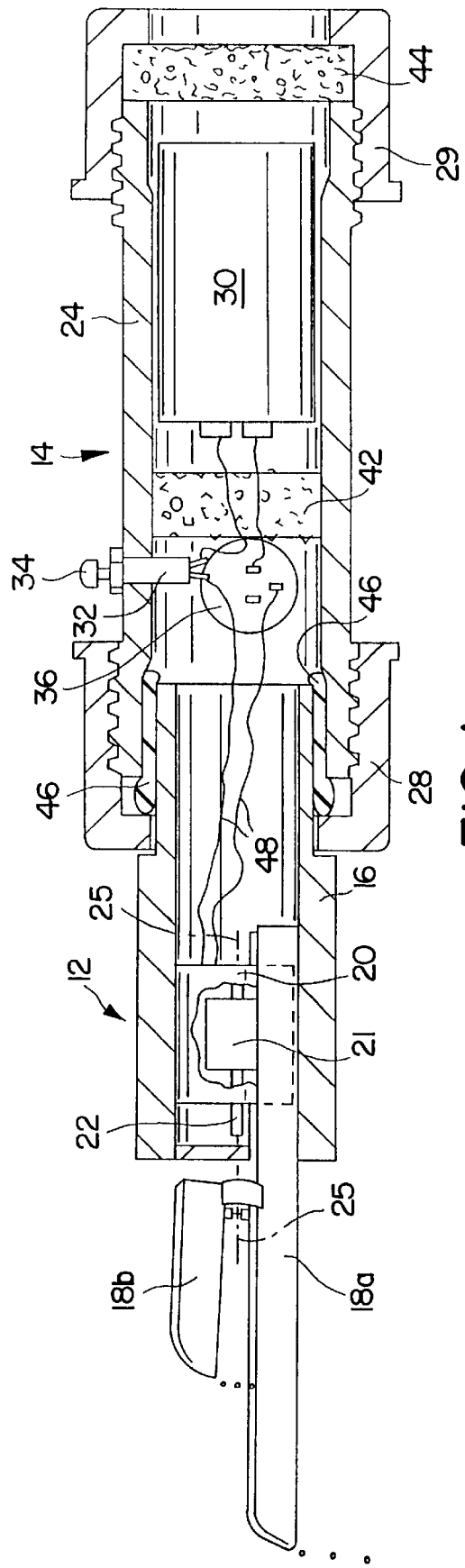
FIG. 1 shows in side sectional view a first preferred embodiment of a hand-held particle dispenser of this invention.

The hand held particle dispenser of FIG. 1 is composed of a motor-spatula assembly 12 and a handle 14.

The motor-spatula assembly 12 has a cylindrical plastic tube 16. An aluminum spatula 18a has a proximal end portion inserted into the plastic tube 16 and attached firmly thereto, e.g. by a forced fit with a DC motor 20 that is positioned in the trough of spatula 18a proximal end portion, and attached firmly to the spatula.

In the preferred embodiment of FIG. 1, the extended portion of the drive shaft 22 is purposefully left free, i.e. drive shaft 22 is not connected to a mechanical load, and in fact may be cut off. However, the rotors (e.g. rotor 21 of motor 20 in FIG. 1) of all small low cost DC motors suitable-for use in particle dispensers, or seeders, of this invention, inherently acquire at manufacturing a small degree of eccentricity, namely the center of gravity of the rotor does not lie exactly at the axis 25 of the rotor rotation in the motor housing.

Such inherent eccentricity of the rotor is usually sufficient to cause adequate vibration of the motor-spatula assembly 12 for efficient dispensing of seeds, powder particles and other particles.

When the rotor of the motor does not have sufficient inherent eccentricity to dispense large seeds, e.g. squash and pumpkin seeds, additional eccentricity can be imparted to the rotor 22. This is most readily effected at a drive shaft portion that extends away from the body of the body of the motor.

Figure 4:
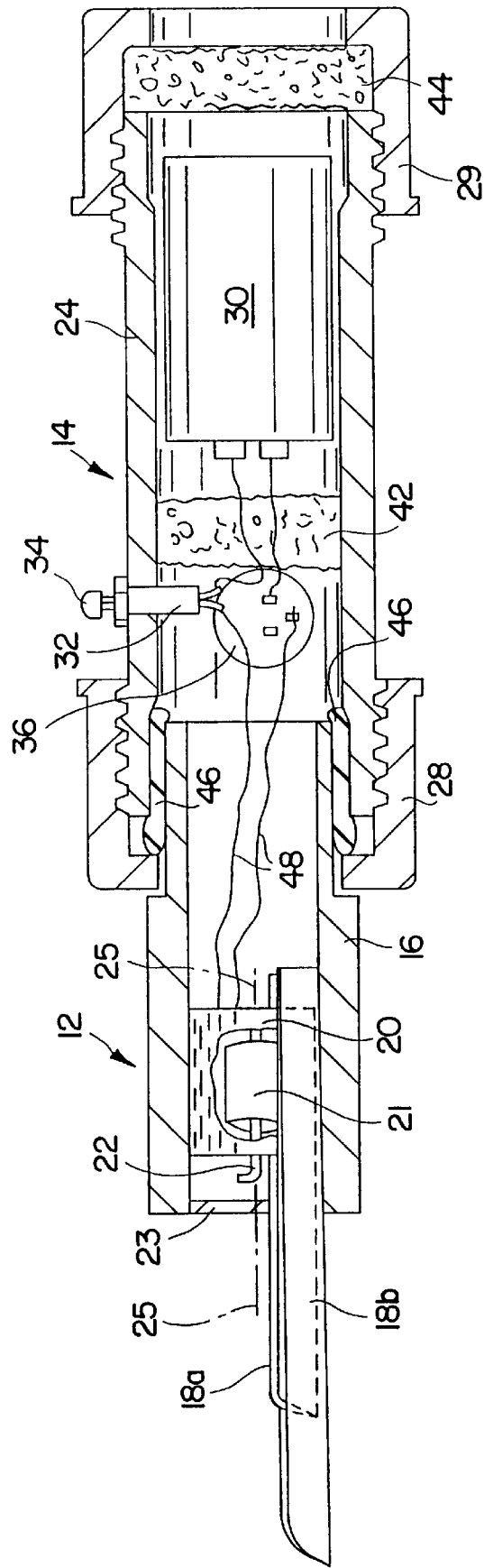
FIG. 4 shows in side sectional view a second preferred embodiment of a hand-held particle dispenser of this invention.

For example a cam may be pressed onto the extended portion of the drive shaft 22 (not shown). Alternatively, the drive shaft itself 22 may be flattened on one side (not shown) or the motor shaft 22 can easily be bent as illustrated in FIG. 4. However, the dispensing of very small seeds can be done very effectively using motors with only inherently eccentric rotors.

The basic member of the handle 14 is a cylindrical pipe 24, outside end portions of which are threaded. Plastic end caps 28 and 29 each have inner threads for mating with the outer threads at one and the other ends respectively of pipe 24. A battery 30 is positioned in the hollow of the pipe 24. A push-button switch 32 is mounted in a hole of the pipe wall with the push-button 34 extending outside the pipe 24. A manually adjustable potentiometer 36 is mounted in another hole in pipe 24 so that the control knob 37, seen in FIG. 2, extends to the outside of the pipe 24. Foam plastic stops 42 and 44 are positioned in the pipe to form a restraining chamber within the pipe 24 for the battery 30. A solid plastic tube stop 23, having a V-shaped orifice through which the spatula 18a extends, is mounted in the distal end of the tube 16 to prevent seeds from entering the tube 16.

The motor-spatula assembly 12 and the handle 14 are joined by inserting, into one hollow end of the handle pipe 24, the end of tube 16 that is opposite the tube end from which the spatula 18a extends. An annular rubber gasket is positioned between the outer surface of the inserted end of tube 16 and the inner wall surface at the end of pipe 24. End cap 28 is thereafter screwed to tighten and compress the rubber gasket so that the motor-spatula assembly 12 is attached and mounted to the handle 14 only through the annular rubber gasket 46.

The two lead wires 48 from the motor 20 are connected respectively to terminals of the switch 32 and the potentiometer 36. And the other terminals of the switch 32 and the potentiometer 36 are connected to the two terminals of the 9 volt battery. The potentiometer resistance may be manually varied from zero to 100 ohms to vary the speed at which the motor runs when the switch 34 is closed.

If particles were poured into a middle trough portion of the vibrating spatula 18a, the result is a pile of particles that spreads and eventually spill out and are dispensed from the distal end of spatula 18a. Switch 34 is pushed on to excite the motor causing the entire motor-spatula assembly 12 to vibrate at a dominant frequency.

The dominant frequency of spatula vibration is determined by the speed of the motor and thus can be manipulated by changing the resistance of the potentiometer 36 via knob 37.

I have found it highly advantageous to mount a shorter spatula 18b to and over the spatula 18a as shown in FIG. 1, into which the particles are partially singulated and dispensed rather than poured into the spatula 18a. Two metal struts 31 and 33 are shown welded to spatula 18a and to the proximal end of the short spatula 18b in FIG. 3, for supporting and indirectly vibrating spatula 18b. The distal end of spatula 18b is thus fixedly positioned over a middle portion of spatula 18a. The proximal end of the short spatula may include a stop plate 19 as seen in FIG. 2.

When particles are poured into spatula 18b, they are caused to fall mostly one by one into the trough of spatula 18a. Consequently no pile of particles is formed in the trough of spatula 18a and singulation is further improved, especially because good singulation becomes less critical with respect to how the hand held particle dispenser is held and otherwise manipulated.

By tilting the hand held dispenser with the distal ends of the spatulas up or down it is possible to control the rate of dispensing and singularity of the falling particles from the long spatula 18a. By moving the distal end of the long spatula laterally, it is possible to drop one seed into each of a row of small earth containing pockets in a plug tray.

Although good results are achieved when the dual spatulas are mutually parallel, optimized singulation may be achieved when the short spatula distal end is tipped slightly upward away from the long spatula, and not quite parallel with it.

When dispensing tiny seeds, such as carrot seeds, it has been found that the provision in spatula 18a of one or more dremples helps to singulate the seed and cause them to drop off one at a time when the motor is activated. For example, dremples 50a are shown in FIGS. 2 and 3, protruding into the trough of the spatula 18a. Similar dremples 50b are also formed in the short spatula 18b as seen in FIGS. 2 and 3.

The term dremple is used herein to mean a protruding bump or ridge, i.e. suggesting the inverse of a dimple or rill. Such a series of dremples 50a are preferred to be located adjacent to the distal end of the spatula and offset from the valley bottom of the V-shaped spatula trough to either one spatula side or the other as seen in FIG. 3.

By using a spatula, 18a or 18b, in which a series of dremples 50a and 50b are formed, even better singulation is achieved. As seen in FIG. 2 five dremples are formed in a row paralleling the bottom valley line 17a of the V-shaped spatula trough of spatula 18a. Likewise the dremples 50b are formed in a row paralleling the bottom valley line 17b of the V-shaped trough of spatula 18b. The end of the series of dremples 50 is located adjacent the distal end of spatula 18. For reasons not fully understood, these dremples 50 have been seen to enhance singulation and regularity of dispensing, one at a time, such small seeds as Raw Petunia, carrots, etc.

Although the dremples 50 are shown as being the same size, it may be advantageous, for universally improving the singulation of seeds of a wide range of sizes, to provide a series of dremples of progressively increasing size with reference to the distal end of the spatula.

The particle dispenser of FIG. 4 is the same as that of FIGS. 1, 2 and 3, except that the vibrator motor 21 is mounted directly to the proximal end of a short spatula 18a, and a long spatula 18b is positioned below the short spatula 18a. The proximal ends of the two spatulas 18a and 18b are abutting and pressed together with the motor 20 in the tube 16. The two spatulas 18a and 18b are almost but not quite parallel.

The long lower spatula 18b is bent slightly so that the distal end of short spatula 18a is spaced away from the valley bottom in the trough of spatula 18b. Both spatulas are vibrated by the same motor 21. Particles poured into the trough of the short upper spatula 18a fall regularly into a middle portion of the long lower spatula 18b and fall from the distal end of the long spatula 18b even more regularly.

Figures 5, 6, 7:
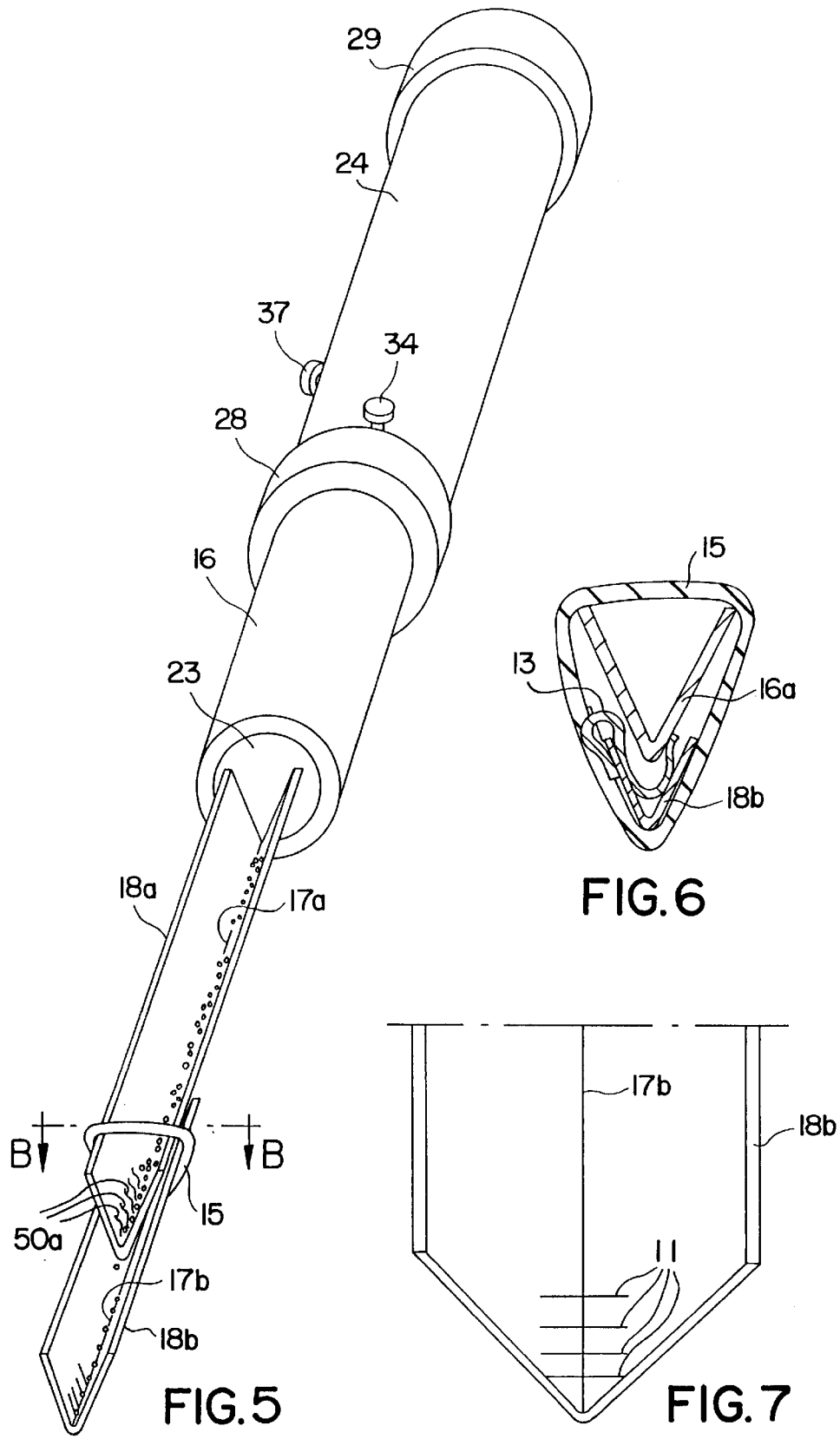
FIG. 5 shows in perspective view a third preferred embodiment of a hand-held particle dispenser of this invention.
FIG. 6 shows the two spatulas of the particle dispenser of FIG. 4 in sectional end view, taken in section B—B of FIG. 4.
FIG. 7 shows in top view the distal end portion of the second spatula 18b of the dispenser of FIG. 5.

The particle dispenser of FIGS. 5 and 6 are like that of FIG. 4 except a long spatula 18a has a proximal end connected to the vibrating tube 16 and a relatively short spatula 18b is positioned below by having a proximal end connected mechanically to but spaced away from the distal end of the long upper spatula 18a. The connecting means is best shown in the sectional view of FIG. 6 whereby a spacer 13 formed of a bent metal strip separates the two spatulas 18a and 18b and an elastic O-ring 15 holds the spatulas together.

As illustrated in FIG. 5, a series of about equally spaced dremples 50a are formed in the long spatula 18a and a series of about equally spaced rills 11 are formed at the distal end of the short spatula 18b.

The rills 11 were scored, using a steel scribe and a straight edge, in the piece of sheet aluminum that was subsequently bent to form the troughed spatula 18b. These rills 50b are at right angles (90°) to the valley bottom of the trough as seen in FIG. 7, and were found to be particularly effective in achieving singulation of tobacco seeds that are very small (a millimeter or two in diameter) spherical seeds.

However it should be considered that scribing probably forms a rill accompanied by a microscopic ridge rising on either side of the rill above the trough surface. If a rill were formed by another means that did not produce such raised portions in the trough surface, it is believed that it also would improved singulation of particles because it too would act as a vibrating baffle plate tending to randomly knock back some of the particles that fell into the rill. It is believed that either rills or dremples will lead to better singulation, but which are best for singulating and dispensing at a particular rate particles of a particular geometry would require empirical study including the relative dimensions of particle and dremple/rill.

Figure 8:
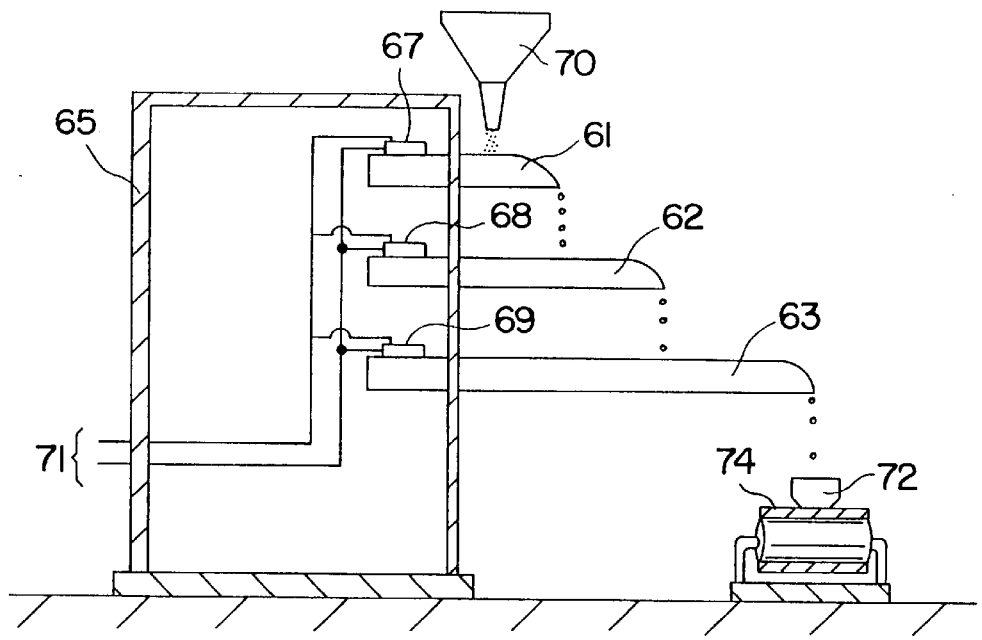
FIG. 8 shows in a break-away side view a fourth embodiment of a mounted seed dispenser of this invention and a conveyor belt carrying plug trays into which the seeds are dispensed.

Referring now to FIG. 8, three straight, elongated, V-shaped spatulas 61, 62 and 63 are mounted about mutually parallel with their proximal ends contained in a base housing 65. Fastened into the proximal ends of the three spatulas 61, 62 and 63 are three electrical motors 67, 68 and 69 respectively, each motor having imbalanced rotors as is the above described motor in FIG. 1. When the input lines 71 leading to the motors 67, 68 and 69 are connected to an electrical energy source, the spatulas 61, 62 and 63 are vibrated.

The distal end of the first spatula 61 is positioned directly over the open face of a mid portion of the second spatula so that seeds poured from funnel 70 into the first spatula are dispensed into the second spatula 62, and likewise the second spatula distal end is directly over a mid portion of the third spatula 63. The seeds are regularly dispensed from the distal end of the third spatula directly down into plug tray pockets 72 that travel on a conveyer belt 74 (moving into or out of the paper as seen).

Figure 9:
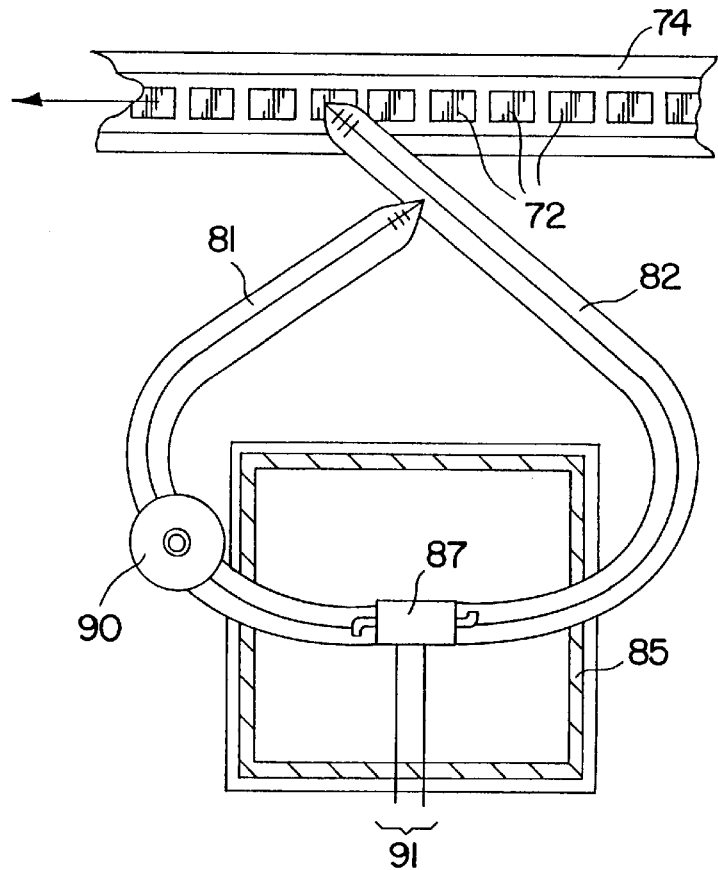
FIG. 9 shows a break-away top view of a fifth embodiment of a mounted seed dispenser of this invention.

The seed dispenser shown in top view in FIG. 9 includes two elongated, curved, V-shaped spatulas 81 and 82 are mounted with their proximal ends contained in a base housing 85. Fastened into the proximal ends of the two spatulas 81 and 82 is one electrical motor 87 having in imbalanced rotor. When the input lines 91 leading to the motor 87 are connected to an electrical energy source, the spatulas 81 and 82 are vibrated.

The distal end of the first spatula 81 is positioned directly over the open face of a mid portion of the second spatula so that seeds poured from funnel 90 into the first spatula are dispensed into the second spatula 82. The seeds are regularly dispensed from the distal end of the second spatula directly down into plug tray pockets 72 that travel on a conveyer belt 74.

It has been observed that spatulas made of stainless steel sheet vibrate more vigorously and tend to distribute particles at a faster rate than do those made of the softer less stiff sheet aluminum, under the same conditions of vibration. Thus a particle dispenser, wherein a first and second spatula are made respectively of aluminum and stainless steel and are vibrated from the same vibration source, may dispense seeds more regularly than one wherein both spatulas are made of the same material.

I claim:

1. A particle dispenser comprising:
   a) a base housing;
   b) a vibration means supported by said base housing;
   c) a pair of elongated V-shaped spatulas each having a proximal end portion connected to said vibration means to become vibrated by said vibration means, the distal ends of said pair of spatulas extending away from said base housing in about the same direction, a bottom side of a first of said V-shaped spatulas facing the open trough side of the second of said V-shaped spatulas, a spatula bottom side being defined as the opposite side of the spatula open trough side, the distal end of said second spatula extending farther away from said base housing than the distal end of said first spatula;
   so that when particles are poured into the open trough side of said first spatula, the particles may become vibrated to fall regularly from the first-spatula distal end into a middle open trough portion of said second spatula, and will become vibrated again to fall at a more regular rate from the farther-extending second-spatula distal end.

2. The particle dispenser of claim 1 wherein at least one surface interruption is formed in a trough surface near the trough valley bottom of each of said V-shaped spatulas.

3. The particle dispenser of claim 2 wherein said surface interruption in at least one of said spatulas is a dremple protruding inward of the trough of said at least one spatula and is located adjacent the distal end of said at least one spatula.

4. The particle dispenser of claim 2 wherein said surface interruption in at least one of said spatulas is a rill that extends in at least one direction away from the trough valley bottom of said at least one spatula and is located adjacent the distal end of said at least one spatula.

5. The particle dispenser of claim 1 wherein a series of surface interruptions is formed in one of the two trough surface sides of at least one of said V-shaped spatulas, said series of surface interruptions being arraigned in a row that is parallel to and adjacent the valley-bottom of said at least one spatula trough.

6. The particle dispenser of claim 5 wherein a first of said series of surface interruptions is located adjacent the distal end of said spatula.

7. The particle dispenser of claim 1 additionally comprising an energy source connected to said vibration means for energizing said vibration means, wherein said base housing is a handle that houses said energy source, said particle dispenser thereby being a hand held particle dispenser.

8. The particle dispenser of claim 7 wherein said energy source is a battery contained in said base housing.

9. The particle dispenser of claim 1 wherein said vibration means is an electrical motor fixedly mounted to a proximal end portion of said first V-shaped spatula, said motor including a rotor with a drive shaft, and said rotor being eccentric by having a rotational center of gravity not exactly co-axial with the axis of rotation of said rotor.

10. The particle dispenser of claim 1 wherein said proximal end portion of said second V-shaped spatula is connected directly to said vibration means and the proximal end portion of said first V-shaped spatula is connected to a middle portion of said second V-shaped spatula.

11. The particle dispenser of claim 1 wherein said proximal end portions of said pair of elongated V-shaped spatulas are connected together and to said vibration means.

12. The particle dispenser of claim 1 wherein said proximal end portion of said first V-shaped spatula is connected directly to said vibration means and the proximal end portion of said second V-shaped spatula is connected to a middle portion of said first V-shaped spatula.

13. The particle dispenser of claim 1 additionally comprising a third V-shaped spatula having a proximal end connected to said vibration means, the distal ends of said third spatula extending away from said base housing in about the same direction as said pair of spatulas, the bottom side of a second of said pair of V-shaped spatulas facing the open trough side of the third V-shaped spatula, the distal end of said third spatula extending farther away from said base housing than the distal end of said second spatula.

14. The particle dispenser of claim 1 wherein said base housing is adapted to be fixedly mounted, said pair of spatulas extending horizontally from a side of said base housing with the open trough faces thereof directed upward, said particle dispenser additionally comprising a third V-shaped spatula extending horizontally beneath said second spatula from said side of said base housing with open trough face directed upward, the distal end of said third spatula extending farther away from said base housing than the distal end of said second spatula, so that when particles are poured into the open side of said first spatula, the particles may become vibrated to cascade from said first-spatula distal end into a middle open-face portion of said second spatula, from the distal end of said second spatula into a middle open-face portion of said third spatula to fall at a highly regular rate into containers that may be moving single file under the particles fall from the farthest-extending distal end of said third-spatula.

15. The particle dispenser of claim 1 wherein said pair of spatulas extend away from said base housing in about the same direction and said first-spatula distal end is tipped slightly further away from said second spatula and is thus not quite parallel with said first spatula.

* * * * *